UNITED STATES PATENT OFFICE.

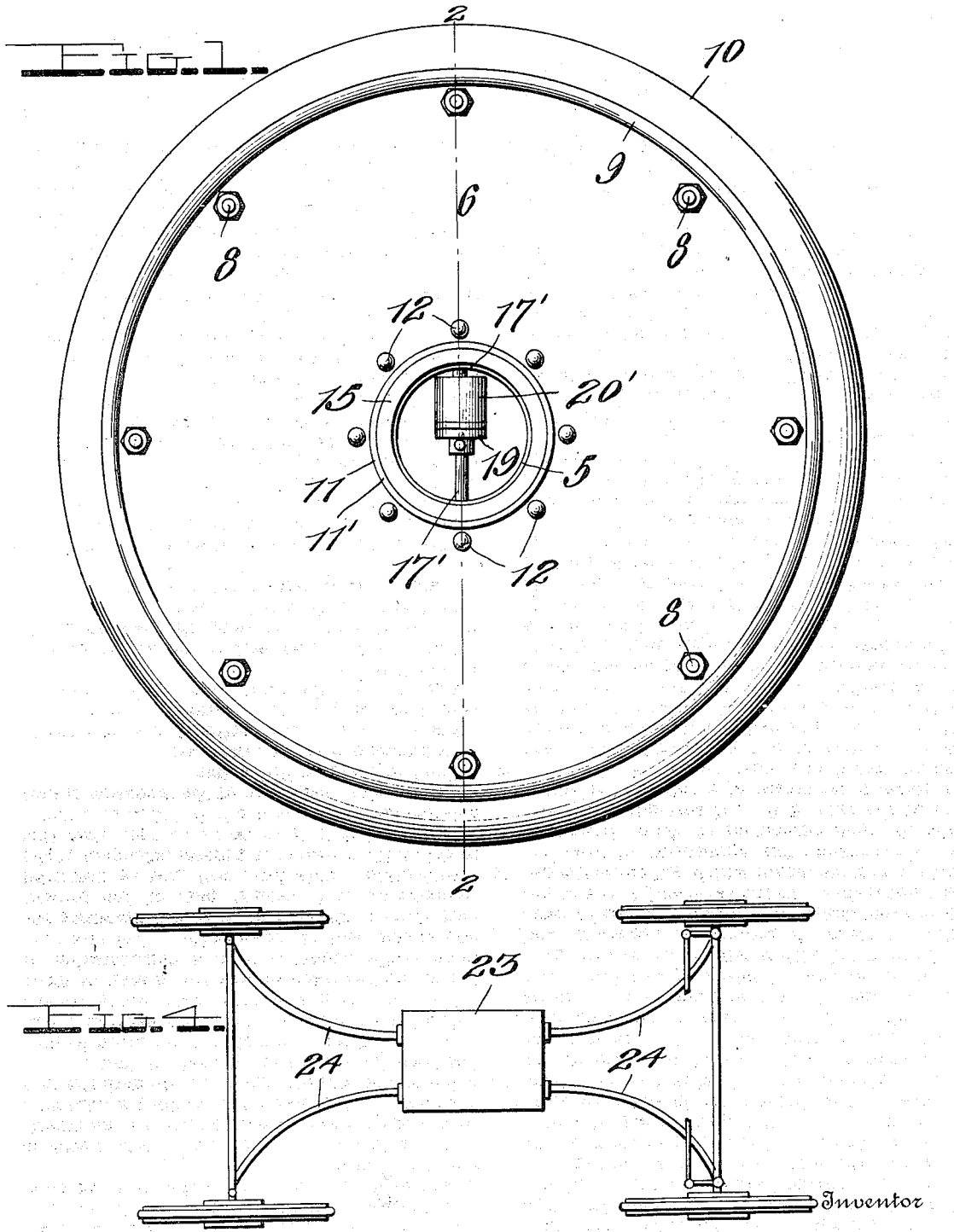

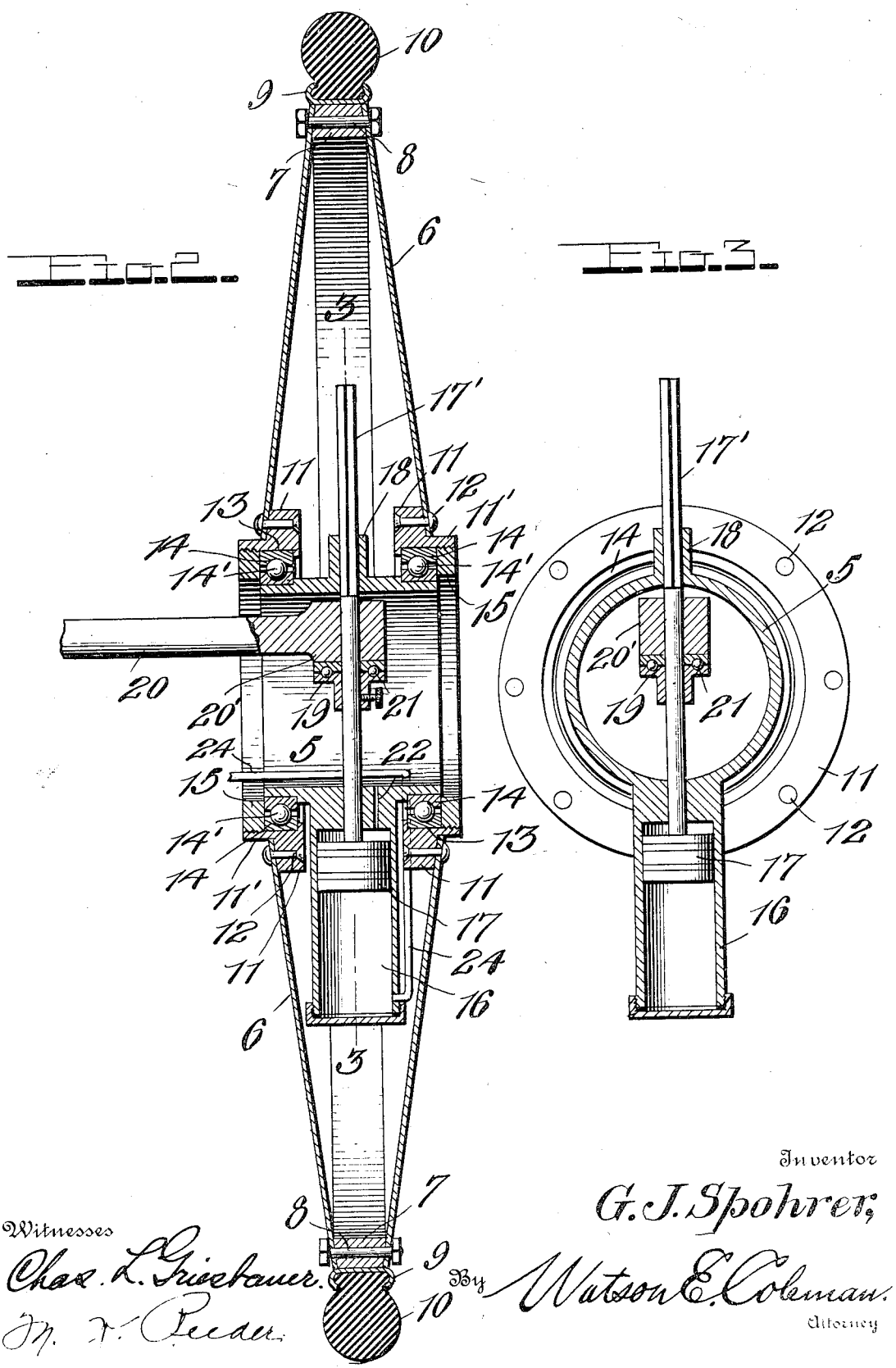

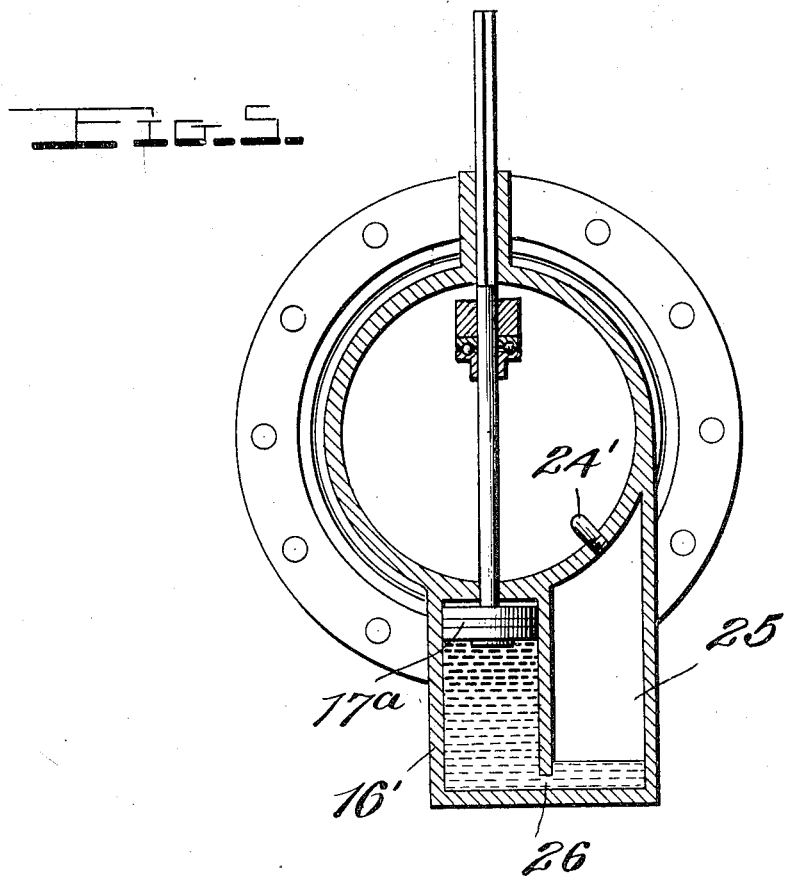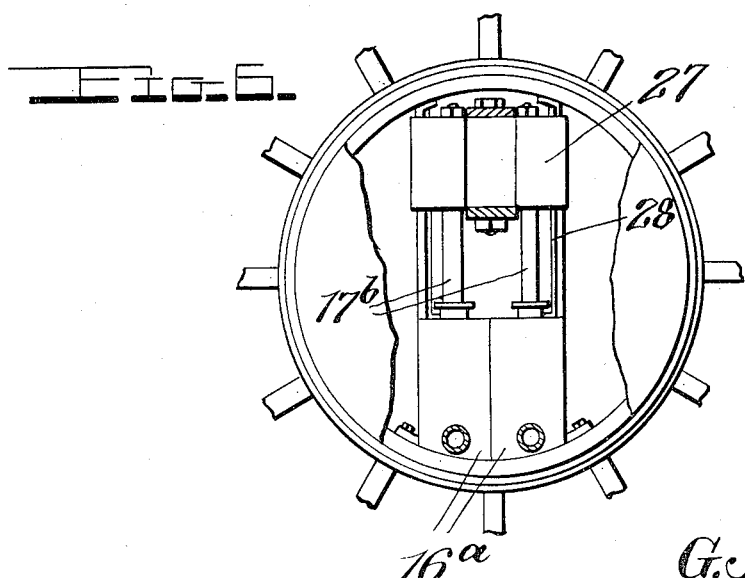

GREGORY J. SPOHRER, OF FRANKLIN, PENNSYLVANIA.

VEHICLE-WHEEL.

993,466.  Specification of Letters Patent.  Patented May 30, 1911.

Application filed August 24, 1910. Serial No. 578,654.

*To all whom it may concern:*

Be it known that I, GREGORY J. SPOHRER, a citizen of the United States, residing at Franklin, in the county of Venango and State of Pennsylvania, have invented certain new and useful Improvements in Vehicle-Wheels, of which the following is a specification, reference being had to the accompanying drawings.

This invention relates to vehicle wheels and more particularly to an automobile wheel of such construction as to absorb all shocks and jars to the body of the vehicle, the usual pneumatic tire being entirely eliminated whereby the cost of construction is materially reduced.

The primary object of my invention is to provide a vehicle wheel of the above character and means associated therewith and connected to the body supporting axle, to pneumatically cushion the axle in the passage of the wheel over undulating grade surfaces.

Another object of my invention resides in the provision of a stationary cylindrical wheel hub, the body of the wheel being mounted to rotate thereon, and pneumatic cushioning means carried by the hub and connected to the vehicle axle extending into said hub, whereby said axle is maintained in a stationary position and vibration of the vehicle body eliminated.

A still further object of my invention is to provide a motor vehicle wheel having a solid rubber tread, said wheel having a stationary hub carrying an air cylinder, a piston to reciprocate in the cylinder having its rod connected to the vehicle axle, and an air supply tank carried by the vehicle and connected to the air cylinder.

An additional object is to provide a pneumatically supported axle mounted in the hub of a wheel, said wheel being bodily movable on the axle and provided with a solid tire; whereby the peripheral indentation of the tire, due to the weight of the car when pneumatic tires are employed, is eliminated, thereby greatly economizing in the consumption of power and providing a better cushioning effect of the body of the vehicle.

With these and other objects in view, the invention consists of the novel features of construction, combination and arrangement of parts hereinafter fully described and claimed, and illustrated in the accompanying drawings, in which—

Figure 1 is a side elevation of a wheel embodying my improvements; Fig. 2 is a vertical section taken on the line 2—2 of Fig. 1; Fig. 3 is a section taken on the line 3—3 of Fig. 2; Fig. 4 is a diagrammatic plan view of the supporting wheels of a motor vehicle, showing the air tank and the connections between said tank and the air cylinders of the wheel hubs. Fig. 5 is a detail sectional view of a slightly modified form and, Fig. 6 is a view illustrating a further modification.

The present invention is devised with a view to eliminating the necessity of employing pneumatic tires in the construction of vehicle wheels. This is the common means employed for absorbing vibration caused by the movement of the vehicle over uneven or undulating grade surfaces. Its inefficiency, however, is commonly recognized as pneumatic tires are subject to numerous punctures and blow outs, thereby greatly increasing the expense of maintenance and necessitating their frequent renewal. This great deficiency in the construction of motor vehicle wheels is one of primary importance and which I aim to overcome by means of the construction disclosed in the accompanying drawings and fully described in the following specification.

In the accomplishment of the above named end, I employ a cylindrical hub 5 which supports the wheel structure proper. With the hub 5 of the wheel the ends of the axle are associated and are pneumatically supported, the weight of the car body resting directly upon the axle and being supported by compressed air, which actuates suitable mechanical means carried by the wheel and connected with the axle. In the embodiment of my invention illustrated in the accompanying drawings, the usual wheel spokes are eliminated and in lieu thereof the opposed, slightly conical circular plates 6 are utilized. An annulus 7 is arranged between the outer edges of the body plates 6 of the wheel and is rigidly secured between the same by a plurality of bolts 8. Upon the periphery of the annulus 7, the tire rim 9 is secured and in this tire rim the tire 10 is rigidly secured. This rim 9 and the tire 10 may be of any desired cross sectional form, the only feature of this portion of my improved wheel being in the utilization of a solid rubber tire instead of the usual pneumatic tire. It will be understood that the body plates 6 may also be of other forms than that shown in the drawing but these plates would preferably be continuous throughout the circular and radial directions of the wheel so as to add to its strength and durability.

To the inner edges of the body plates 6 the steel rings 11 are secured by means of suitable fastening devices 12. These rings are formed with interiorly threaded flanges 11' which extend beyond the outer faces of the plates 6. Inwardly of the screw threaded flanges, the rings 11 are circumferentially grooved as indicated at 13 to receive one section of the annular ball race 14, the other section of which is arranged in concentric relation thereto and is mounted upon the end of the cylindrical hub 5. Between these race rings the bearing balls 14' are arranged and support the wheel body upon the hub 5 for rotary movement. A retaining ring 15 is threaded into the annular flanges 11' of the rings 11, said rings engaging the ball races 14 on the ends of the cylindrical hub 5.

The hub 5 carries a depending air cylinder 16 in which the piston 17 is mounted to reciprocate. The piston rod 17' is movably disposed through the hub 5 at diametrically opposite points, said hub opposite to the cylinder 16 being formed with a tubular extension 18. A plate 19 is formed on one end of a collar fixed upon the piston rod 17'. The vehicle body supporting axle 20 is provided with an enlargement 20' disposed within the hub 5. Through this enlargement the piston rod 17' extends, the end of the axle being supported thereon by the plate 19 and between this plate 19 and the end of the axle the ball bearings 21 are disposed. The sleeve or extension 18 of the hub 5 is formed with a square bore which receives the upper rectangular portion of the piston rod. Thus it will be seen that the piston rod may have free longitudinal movement through the hub but is prevented from rotating by its engagement in the extension 18. The piston rod 17' is loosely disposed through the cylindrical hub 5 at the air cylinder 16 so as to permit the slow exhaust or leak of the air around the piston rod. A small pin hole 22 may also be provided for the passage of this air.

As shown in Fig. 4 of the drawings, an air supply tank 23 is mounted upon the chassis of the vehicle. The connection between the axle 20 and the piston rods 17' of the rear wheels is rigid while the connection of the front axle to the piston rods is such as to allow of the rotation of the piston rods in the ends of the axle when the vehicle wheels are turned in the steering of the machine. This latter connection is shown in the accompanying drawings wherein it will be noted that the squared portion of the piston rod is above the end 20' of the axle so as to allow of the free turning movement of the vehicle wheel. The air supply tank 23 is connected by means of a plurality of flexible pipes 24 with the lower end of each of the air cylinders 16, said pipes extending through the hubs of the wheels as clearly shown in Fig. 1 of the drawings.

In the practical operation of my invention, the air capacity of the tank 23 is such that the air therein will not be unduly compressed upon the downward stroke of the pistons 17, thereby allowing the air to pass in and out of the cylinder 16 through the pipes 24. It will be seen that the downward stroke of the piston 17 would be occasioned by the wheel passing over an obstruction in the road while when the wheel enters a depression, the piston 17 moves upwardly in its cylinder, the air supply from the tank 23 forcing the piston upwardly and sustaining the same. By providing this pneumatic supporting means for the axle, it will be obvious that in the radial movement of the wheel the axle will remain substantially stationary, as the wheel passes over road obstructions or enters depressions, such radial movement of the wheel between the wheel hub and the axle being assimilated by the movement of the piston upon the body of compressed air within the cylinder 16. There is practically no waste of air in the operation of the device so that the air tank 23 need only be replenished at long intervals. It will further be obvious from an inspection of Fig. 2 of the drawings that upon the down stroke of the piston, a partial vacuum will be created in the cylinder 16 and a small amount of air enter the upper end of the cylinder around the rod 17' and through the opening 22. This partial vacuum will greatly assist in the cushioning of the vehicel body and the absorption of shocks and jars thereto. Also upon a quick upward stroke of the piston caused by the vehicle wheel suddenly entering a depression in the road surface, the air in the upper end of the cylinder will be compressed before it can escape through the opening 22 and around the piston rod 17', thus insuring the proper cushioning of the car body and the elimination of all vibrations.

In Fig. 5 there is illustrated a slight modification of the main form of my invention, wherein the cylinder 16' has integrally formed therewith and with the wheel hub a casing 25, said casing being adapted to contain oil or grease which flows through a communicating port 26 into the cylinder 16' beneath the piston 17ª arranged therein. The air pipe 24' communicates with the oil chamber 25 at its upper end and extends to an air tank or reservoir as in the preferred form of the invention. The body of oil or grease is moved or forced through the communicating port 26 into the chamber 25 upon the downward stroke of the piston 17ª, thereby compressing the air in the upper end of the chamber 25, and forcing the same through pipe 24', thereby cushioning the body of the machine in the upward movement of the vehicle wheel, as it passes over road obstructions. The reverse of this operation takes place upon the upward movement of the piston 17ª, the air which has been compressed in the chamber 25, together with the pressure from the main supply tank forcing the body of oil or grease downwardly and through the port 26, thus raising the piston in the cylinder as the vehicle wheel enters a depression. In this modified construction of the device, the compressed air acts directly upon the movable body of oil or grease, thus providing what might be properly designated a flexible plunger or packing between the piston and the bottom of its cylinder. The principle of the device remains the same in either case, the axle being substantially stationary in the radial movement of the vehicle wheel.

In Fig. 6 I have illustrated a slightly further modification of the invention wherein two cylinders 16ª are employed, each connected at their lower ends with the air supply tank. It will be noted that in this form of the device the cylinders are mounted directly in the hub of the wheel, but it will be understood that if found more desirable they may be arranged beneath the hub as in the main form of the device. The end of the axle is rigidly connected to the upper ends of the piston rods 17ᵇ by means of a block 27 arranged upon the upper ends of said rods and mounted for movement between suitable guides 28, the axle being fixed to the central portion of block 27. These modified forms of the invention may also be combined, and the intermediate movable body of fluid between the piston and the compressed air utilized in the operation of the device when two or more cylinders 16ª are employed.

From the foregoing it is believed that the construction and operation of my improved vehicle wheel will be readily understood. The device is comparatively simple and by the elimination of the usual pneumatic tire, the cost of repairs is reduced to a minimum. The car body supporting axle is pneumatically mounted in the wheels at their centers. By providing this pneumatic cushion at the center of the wheel instead of its periphery, it will be obvious that a wheel of very great efficiency is produced and the objections to wheels of this character of the common construction are entirely overcome.

While I have shown and described the preferred construction and arrangement of the various elements, it will be understood that my invention is susceptible of a great many minor modifications without materially departing from the essential features or sacrificing any of the advantages thereof.

Having thus described the invention what is claimed is:—

1. The combination with a wheel axle, of a wheel including a cylindrical hub, a cylinder carried by the hub, a piston in said cylinder having a stem extending through the hub and the end of the wheel axle, and means for admitting air to one end of said cylinder to yieldingly support the piston therein.

2. The combination with a vehicle axle, of a wheel comprising a hub open at both ends and a body mounted to rotate upon said hub, said axle extending into the hub, a cylinder carried by the hub, a piston in said cylinder and having a stem extending through the hub at diametrically opposite points and through the end of the axle, said axle having pivotal movement on the piston stem, means for preventing the rotation of the piston, and means for cushioning the stroke of the piston to yieldingly support the wheel for bodily radial movement with relation to the axle.

3. The combination with a wheel axle, of a wheel comprising a cylindrical hub and a body mounted to rotate thereon, a cylinder carried by the hub, a piston mounted to reciprocate in the cylinder, an air supply pipe connected to one end of the cylinder, said hub having a port therein communicating with the other end of the cylinder, a stem carried by the piston and extending through the hub and through the end of the axle, and means for preventing longitudinal movement of the axle on the piston stem whereby said wheel is yieldingly supported by means of the compressed air cushion in the opposite ends of the cylinder upon the reciprocation of the piston therein.

4. A vehicle wheel comprising a cylindrical hub, an air actuated piston, a piston rod connected therewith extending through the hub at diametrically opposite points, means preventing rotary movement of the piston rod, in combination with a vehicle axle extending into the hub, said piston rod extending through the end of the axle and supporting the wheel for radial movement with relation to the axle, and means arranged on the piston rod to support said axle thereon and permit rotary movement of the piston rod in the axle when the wheel is angularly disposed with relation to the axle.

5. A vehicle wheel comprising a hub open at both ends, a wheel body mounted to rotate on said hub, an air cylinder carried by the hub, an air supply pipe communicating with the lower end of said cylinder from a suitable source of air supply carried by the vehicle, a piston in said cylinder, a rod connected to the piston extending through the hub, said hub having a tubular extension thereon provided with a square bore, one end of the piston rod extending through the extension being square to prevent rotation of the piston rod in the hub, said hub being provided with an opening communicating with the opposite end of the cylinder to the air supply port, in combination with a vehicle axle extending into the hub, said axle and piston being connected whereby the vehicle wheel is supported by said axle for radial movement thereon, such movement being adapted to admit air into the cylinder and exhaust the same therefrom through the air supply pipe at one end of the cylinder, and to draw air into the other end of the cylinder through the opening in the wheel hub and to compress the same between the hub and the piston, such compressed air acting as a cushion in the radial movement of the wheel.

In testimony whereof I hereunto affix my signature in the presence of two witnesses.

GREGORY J. SPOHRER.

Witnesses:
CLYDE M. MILLER,
WM. GRAMLEY.